US011948520B2

(12) United States Patent
Youn et al.

(10) Patent No.: US 11,948,520 B2
(45) Date of Patent: Apr. 2, 2024

(54) VARIABLE REFRESH RATE CONTROL USING PWM-ALIGNED FRAME PERIODS

(71) Applicant: GOOGLE LLC, Mountain View, CA (US)

(72) Inventors: Sang Young Youn, Cupertino, CA (US); Sun-il Chang, San Jose, CA (US); Wonjae Choi, San Jose, CA (US); Sangmoo Choi, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 12 days.

(21) Appl. No.: 17/786,961

(22) PCT Filed: Mar. 31, 2020

(86) PCT No.: PCT/US2020/025980
§ 371 (c)(1),
(2) Date: Jun. 17, 2022

(87) PCT Pub. No.: WO2021/201844
PCT Pub. Date: Oct. 7, 2021

(65) Prior Publication Data
US 2023/0030201 A1 Feb. 2, 2023

(51) Int. Cl.
*G09G 3/34* (2006.01)

(52) U.S. Cl.
CPC ... *G09G 3/3406* (2013.01); *G09G 2320/0252* (2013.01); *G09G 2320/064* (2013.01); *G09G 2340/0435* (2013.01)

(58) Field of Classification Search
CPC .................................................... G09G 3/3409
See application file for complete search history.

(56) References Cited

U.S. PATENT DOCUMENTS

| | | | |
|---|---|---|---|
| 9,495,926 | B2 | 11/2016 | Tripathi et al. |
| 9,786,255 | B2 | 10/2017 | Verbeure et al. |

(Continued)

FOREIGN PATENT DOCUMENTS

| | | | |
|---|---|---|---|
| CN | 102472903 | A | 5/2012 |
| CN | 110444155 | A | 11/2019 |

(Continued)

OTHER PUBLICATIONS

International Search Report and Written Opinion dated Nov. 30, 2020 for corresponding International Application No. PCT/US2020/025980, 19 pages.

(Continued)

*Primary Examiner* — Gustavo Polo

(57) ABSTRACT

PWM-frame rate misalignment is mitigated through implementation of a discrete variable refresh rate (VRR) scheme. A target frame rate is limited to a frame rate selected from only those frame rates that facilitate alignment of each frame period to a specified edge of a PWM cycle of a brightness control signal of a display panel. This alignment results in each frame period at the selected frame rate starting at a same point in a corresponding PWM cycle and ending at a same point in a corresponding PWM cycle to help ensure a constant effective duty cycle across each successive frame period, which in turn mitigates perception of flicker that otherwise would arise. Further, the discrete VRR scheme can employ a compensation mode for compensating for the delay in rendering or otherwise obtaining a frame for display so as to maintain a consistent duty cycle in the brightness control signal.

17 Claims, 6 Drawing Sheets

(56) References Cited

U.S. PATENT DOCUMENTS

| | | | |
|---|---|---|---|
| 2008/0136355 | A1 | 6/2008 | Han et al. |
| 2011/0175935 | A1 | 7/2011 | S et al. |
| 2013/0314454 | A1 | 11/2013 | Jin et al. |
| 2013/0321254 | A1 | 12/2013 | Kim |
| 2014/0375679 | A1 | 12/2014 | Margolis et al. |
| 2017/0092178 | A1 | 3/2017 | Lee et al. |
| 2018/0007311 | A1 | 1/2018 | Kato et al. |
| 2018/0090080 | A1 | 3/2018 | Chen et al. |
| 2019/0340973 | A1 | 11/2019 | Kim |
| 2019/0370973 | A1 | 11/2019 | Kim |
| 2020/0082768 | A1 | 3/2020 | Oh et al. |
| 2020/0135146 | A1 | 4/2020 | Lee et al. |

FOREIGN PATENT DOCUMENTS

| | | | |
|---|---|---|---|
| TW | 201342347 | A | 10/2013 |
| WO | 2021236069 | A1 | 11/2021 |

OTHER PUBLICATIONS

English Translation of Taiwanese Office Action dated Jun. 27, 2022 for corresponding TW Application No. 110111152, 6 pages.

International Preliminary Report on Patentability dated Oct. 13, 2022 for PCT Application No. PCT/US2020/025980), 14 pages.

Translation of Taiwanese Office Action dated Nov. 29, 2022 for TW Patent Application No. 110111152, 5 pages.

Blur Busters, "Electronic Hacking: Creating a Strobe Backlight," Jul. 14, 2013; downloaded from <<https://www/blurbusters.com/author/scanmaster/>> on Feb. 21, 2022, 32 pages.

ST Microelectronics, "STM32H7-DSI Host: Display Serial Interface Host," Revision 1.0; downloaded from <<https://www.st.com/content/ccc/resource/training/technical/product_training/group0/04/62/1b/8e/e0/bc/4a/cb/STM32H7-Peripheral-DSI_HOST_interface_DSIHOST/files/STM32H7-Peripheral-DSI_HOST_interface_DSIHOST.pdf/jcr_content/translations/en.STM32H7-Peripheral-DSI_HOST_interface_DSIHOST.pdf>> Sep. 26, 2016; 20 pages.

English Translation of Taiwanese Office Action dated Jan. 20, 2022 for corresponding TW Application No. 110111152, 4 pages.

VARIABLE REFRESH RATE CONTROL USING PWM-ALIGNED FRAME PERIODS

CROSS-REFERENCE TO RELATED APPLICATIONS

The present application is a U.S. National Stage application under 35 U.S.C. § 371 of International Patent Application Serial No. PCT/US2020/025980, entitled "VARIABLE REFRESH RATE CONTROL USING PWM-ALIGNED FRAME PERIODS" and filed on Mar. 31, 2020, the entirety of which is incorporated by reference herein.

BACKGROUND

Some video display systems utilize a pulse width modulation (PWM) scheme to control the brightness of a display panel displaying a corresponding video frame. A digital control signal that controls a backlight in a transmissive display panel or directly controls the pixel intensities in an emissive display panel is pulse width modulated such that resulting brightness of the display panel is proportional to the duty cycle of the resulting PWM signal. Any change in the effective duty cycle of the control signal between two successive frame periods thus introduces a corresponding change in brightness at the display panel between the two successive frame periods. In display systems employing a variable refresh rate, the delay in rendering or other generation of a video frame can result in misalignment of the display of the delayed frame or subsequent frames relative to the PWM control signal. As a result, the effective duty cycle of the PWM control signal may change between successive frames. This change in effective duty cycle of the PWM control signal thus may cause one frame to have a lower or greater brightness than the next frame (depending on whether the effective duty cycle increases or decreases between the two frames), and this change in brightness between successive frames often is perceivable to a viewer as flicker, which detracts from the viewing experience.

SUMMARY OF EMBODIMENTS

One aspect of the proposed solution relates to a method comprising controlling a brightness of frames displayed at a display panel via pulse width modulation (PWM) of a brightness control signal provided to the display panel; selecting a target frame rate for display of frames at the display panel so that a corresponding frame period for the target frame rate is an integer multiple of a PWM period of the brightness control signal; and providing frames for display based on the target frame rate such that a frame period of each frame is aligned with a corresponding PWM cycle of the brightness control signal.

In an example embodiment selecting the target frame rate may comprise determining a maximum frame rate and a minimum frame rate that are integer divisors of a PWM frequency of the brightness control signal; and selecting as the target frame rate a frame rate between the minimum frame rate and maximum frame rate and which is an integer divisor of the PWM frequency.

Additionally or alternatively, the method may comprise detecting a delay in rendering of a first frame based on the target frame rate, and, in response to detecting a delay in rendering of a first frame based on the target frame rate, implementing a compensatory variable refresh rate (VRR) scheme that maintains an effective PWM duty cycle of the brightness control signal for each display frame period of at least a subset of frame periods coincident with the delay in rendering. In an example embodiment, a timing controller may be used to detect a delay in rendering. The timing controller may monitor a frame rendering process for an indication that rendering of a current, first frame is, or will be, "delayed"; that is, the rendering of the current, first frame is taking sufficiently long that the current frame may or will not be ready for scan out to the display panel 106 when a frame period for the previous frame (that is, the frame currently being displayed) ends and the frame period for the next frame to be displayed begins. For example, a specified signal may be provided (e.g., by a frame generation subsystem) to signal completion of rendering of a frame, such as through transmission of a data packet. For a given frame rate, this specified signal is provided within a specified delay following assertion of a synchronizing signal, such as a tearing effect (TE) signal. Such a synchronizing signal may be used to synchronize transfer of the next frame from a frame generation subsystem to a buffer. As such, failure to receive this specified signal within the corresponding delay following assertion of the synchronizing signal indicates that rendering of the frame is delayed.

In an example embodiment, the compensatory VRR scheme may comprises two different modes to compensate for a delay in rendering. In this context, the method may also comprise selecting between these two modes, e.g., a frame insertion mode and a frame stretch mode (as examples for two different compensatory discrete VRR modes), based on the target frame rate. For example, a frame insertion mode may be selected in case of the target frame rate being less than a maximum frame rate and a frame stretch mode may be selected in case of the target frame rate being equal to the maximum frame rate.

In an example embodiment, implementing the compensatory VRR scheme may include implementing a frame insertion mode by displaying a second frame at the target frame rate for a first frame period, the second frame rendered immediately prior to the first frame (i.e., directly or just before rendering the first frame in a sequence of frames); responsive to detecting the delay in rendering of the first frame, providing the second frame for display again at a maximum frame rate for a second frame period that commences with termination of the first frame period and is an integer multiple of the PWM period of the brightness control signal; and displaying the first frame at the target frame rate for a third frame period that commences with termination of the second frame period.

Implementing the compensatory VRR scheme may also include implementing a frame stretch mode. Such a frame stretch mode may include displaying a second frame at the target frame rate for a first frame period, the second frame rendered immediately prior to the first frame; determining a scan-in delay that is an integer multiple of the PWM period and which represents a delay between scan in of a frame to a frame buffer and scan out of that frame from the frame buffer to the display panel; responsive to detecting the delay in rendering of the first frame, providing the first frame for display for a second frame period that commences with termination of the first frame period and is equal to a sum of the first frame period and the scan-in delay; and displaying a third frame at the target frame rate for a third frame period that commences with termination of the second frame period.

The proposed solution further relates to a system comprising a frame rendering subsystem configured to render a sequence of frames at a variable rate; and a display control subsystem coupled to the frame rendering subsystem and coupleable to a display panel. The display control subsystem may be configured to provide a brightness control signal to the display panel, the brightness control signal configured to control a brightness of frames displayed at a display panel via pulse width modulation (PWM) of the brightness control signal; select a target frame rate for display of frames at the display panel so that a corresponding frame period for the target frame rate is an integer multiple of a PWM period of the brightness control signal; and transmit frames to the display panel for display based on the target frame rate such that a frame period of each frame is aligned with a corresponding PWM cycle of the brightness control signal.

In an example embodiment, the system may perform an embodiment of the proposed method.

For example, the display panel may be a transmissive display panel and the brightness control signal is a backlight control signal for the transmissive display panel or the display panel may be an emissive display panel and the brightness control signal is an emission control signal for the emissive display panel. Generally, the brightness control signal may be a pulse-width-modulated digital signal used to control the brightness of a display panel. In implementations where the display panel is implemented as an LCD panel or other transmissive display panel, the brightness control signal represents the PWM control signal used to activate the backlight of the transmissive display panel. For emissive display panels, such as OLED and AMOLED display panels, an emission control (EM) signal that is provided to every active pixel is pulse width modulated at a certain duty cycle so as to control the brightness of the corresponding pixels, and in such instances the brightness control signal represents this EM signal.

While a variable refresh rate can mitigate screen tearing and judder and provide for smoother perceived motion, it can lead to synchronization issues between the timing of the display of the frames and a PWM control signal used to control the brightness (also referred to as "intensity") of the display panel used to display the frames. This desynchronization can lead to changes in effective PWM duty cycle between successive frames, which potentially is manifested as flicker to the viewer. The present disclosure describes systems and techniques to mitigate PWM-frame rate misalignments, for example, through implementation of a discrete variable refresh rate (VRR) scheme. In this discrete VRR scheme, the target frame rate employed by a display system is limited to a frame rate selected from only those frame rates that facilitate alignment of each frame period to a specified edge of a PWM cycle of a PWM-based brightness control signal used to control the display panel. This alignment results in each frame period at the selected frame rate starting at a same point in a corresponding PWM cycle and ending at a same point in a corresponding PWM cycle, and thereby helping to ensure a constant effective duty cycle across each successive frame period having the same intended brightness. This, in turn, mitigates the perception of any flicker that otherwise would arise from effective duty cycle changes in the brightness control signal from frame to frame.

Further, in some embodiments, the discrete VRR scheme, as already stated above, may employ one or more compensation modes for compensating for the delay in rendering or otherwise obtaining a frame for display so as to maintain a consistent duty cycle in the brightness control signal. One such compensation mode may be a frame insertion mode in which, responsive to a delayed rendering of a next frame (that is, a rendering of the frame that takes longer than an allotted or otherwise specified time for rendering at the target frame rate), the last-displayed frame is displayed, or "inserted", again with a frame period corresponding to a specified maximum frame rate that facilitates PWM cycle alignment of frame periods. Another such compensation mode may be a frame stretch mode in which, responsive to a delayed rendering of a next frame, the next frame is displayed with an extended, or "stretched", frame period that is longer than the frame period corresponding to the target frame rate, and which has a duration that is selected so as to allow realignment of corresponding timing control signals with the display of the next non-delayed frame. In both of these compensation modes, the frame rate, and thus the frame period, for the insertion of the previous frame again or the stretching of the frame period for the render-delayed current frame is selected so as to align the inserted/stretched frame the PWM cycles of the brightness control signal, and thereby avoid distortion of the effective duty cycle for a frame period impacted by the delayed rendering.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
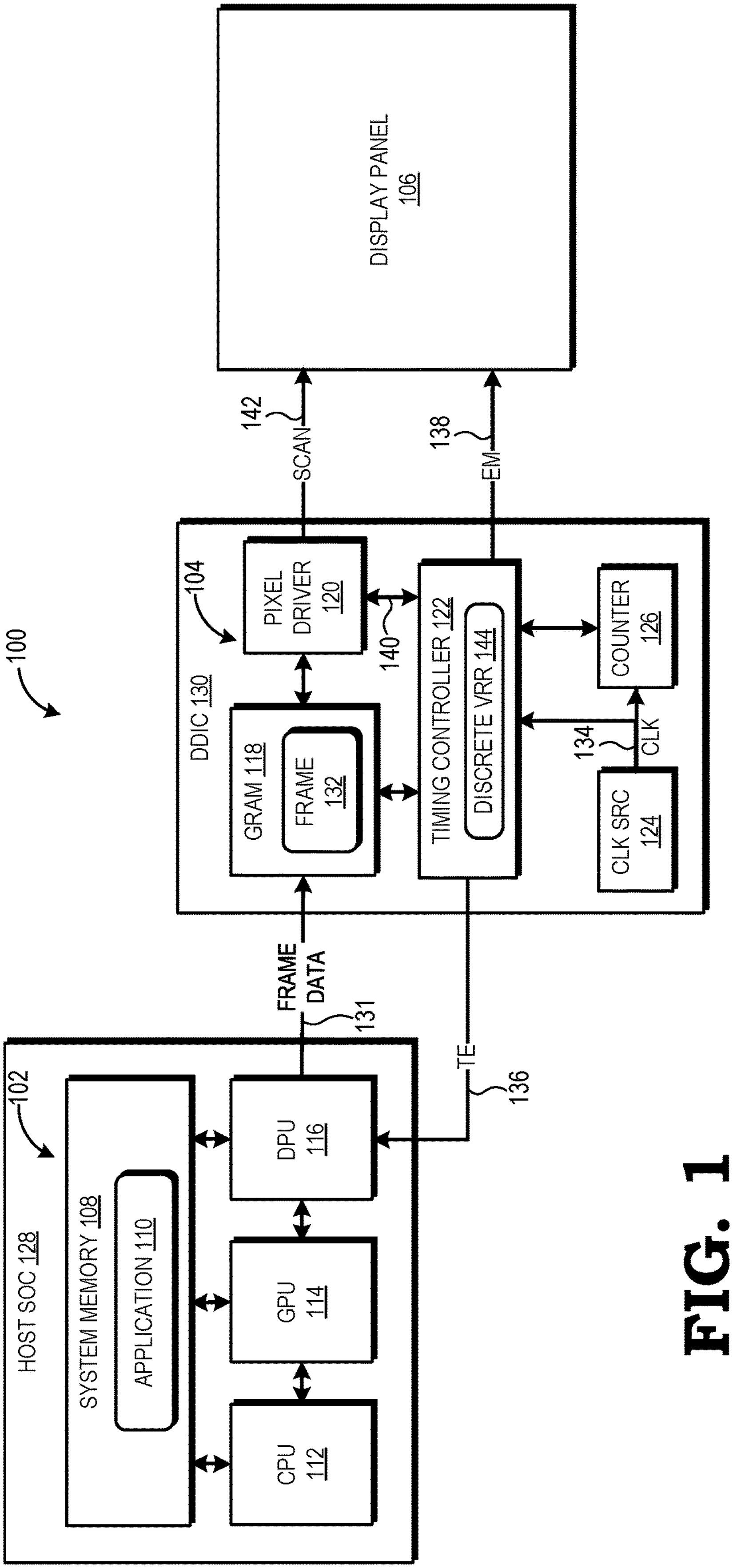
FIG. 1 is a block diagram illustrating a display system employing a PWM cycle-aligned discrete variable refresh rate (VRR) control technique in accordance with at least one embodiment.

FIG. 1 illustrates a display system 100 employing a discrete VRR scheme for mitigating PWM duty cycle distortion in a brightness control signal in accordance with at least one embodiment. The display system 100 can include any of a variety of systems for the rendering, decoding, or other generation of a sequence of video frames for display, such as a desktop computer, a notebook computer, a tablet computer, a compute-enabled cellular phone, a server, a gaming console, a television, a compute-enabled watch or other wearable, and the like. The display system 100 includes a frame generation subsystem 102, a display control subsystem 104, and a display panel 106. The frame generation subsystem 102 operates to generate a sequence of video frames (hereinafter, "frames") for display and includes a system memory 108 storing one or more software applications 110 and a set of one or more processors, such as one or more central processing units (CPUs) 112, one or more graphics processing units (GPUs) 114, and one or more display processing units (DPUs) 116. The display control subsystem 104, in one embodiment, includes a graphics random access memory (GRAM) 118 or other memory operating as frame buffer, a pixel driver 120, a timing controller 122, one or more clock sources 124, and one or more counters 126. The pixel driver 120 and the timing controller 122 are implemented via hardwired logic (e.g., an integrated circuit), programmable logic (e.g., a programmable logic device), one or more processors executing software instructions, or combinations thereof. In the illustrated embodiment, the components of the frame generation subsystem 102 are implemented together in a host system-on-a-chip (SoC) 128 while the components of the display control subsystem 104 are implemented on a separate display driver integrated circuit (DDIC) 130. However, in other embodiments the components of both subsystems 102, 104 are implemented on the same IC or same SoC, or different combinations of components are implemented on different ICs or SoCs. The display panel 106 can include any of a variety of display panels configurable to provide brightness control via PWM duty cycle control, such as a liquid crystal display (LCD) panel, a light emitting diode (LED) panel, an organic LED (OLED) panel, an active-matrix OLED (AMOLED) panel, and the like.

As a general operational overview, the CPU 112 executes the software application 110, which may represent a video game, virtual reality (VR) or augmented reality (AR) application, or other software applications executed to produce a series of frames for display. As part of this execution process, the CPU 112 directs the GPU 114 to render or otherwise generate each frame in the sequence, and the DPU 116 performs one or more post-rendering processes on the frame, such as gamma correction or other filtering, color format conversion, and the like. The frame data 131 for the resulting frame 132 is then transmitted to the display control subsystem 104 for buffering in the GRAM 118.

At the display control subsystem 104, the timing controller 122 uses one or more clock (CLK) signals 134 provided by the one or more clock sources 124 and one or more counters 126 to generate various control signals, including a tearing effect (TE) signal 136, a brightness control signal 138, as well as a vertical blank (VSYNC) signal and a scan start signal (not shown in FIG. 1). The TE signal 136 is used to synchronize the transfer of the next frame 130 from the frame generation subsystem 102 to the GRAM 118 so as to mitigate screen tearing artifacts resulting from overwriting the current frame before the last row of the current frame has been displayed at the display pane 106. The brightness control signal 138 is a pulse-width-modulated digital signal used to control the brightness of the display panel 106. In implementations where the display panel 106 is implemented as an LCD panel or other transmissive display panel, the brightness control signal 138 represents the PWM control signal used to activate the backlight of the transmissive display panel. For emissive display panels, such as OLED and AMOLED display panels, an emission control (EM) signal that is provided to every active pixel is pulse width modulated at a certain duty cycle so as to control the brightness of the corresponding pixels, and in such instances the brightness control signal 138 represents this EM signal. As the following description primarily refers to an OLED- or AMOLED-based implementation for the display pane 106, the brightness control signal 138 is also referred to herein as the "EM signal 138", but reference to an EM signal applies equally to other forms of PWM-based brightness control unless otherwise noted.

The timing controller 122 uses timing signaling and other control signaling 140 to control the pixel driver 120 to drive the display panel 106 to display a frame 132 from the GRAM 118 by scanning the frame data 131 of the frame 132 from the GRAM 118 into the pixel array (not shown) of the display panel 106 with row-line addressing, with the transfer of the pixel data from the pixel driver 120 to the display panel 106 represented by a SCAN signal 142. The pixels of each row are activated so as to emit display light in accordance with the corresponding pixel values for that row, with the brightness of the emitted display light controlled at least in part by the PWM duty cycle of the EM signal 138 during the frame period for display of the corresponding frame 132. In some embodiments, the magnitude of the EM signal 138 also can be adjusted to further control the intensity of the emitted light.

In at least one embodiment, the display system 100 supports a variable refresh rate such that rather requiring that the sequence of frames be rendered and displayed at a fixed frame rate, the frame rate can be modified to accommodate frames that may take different amounts of time to render. To illustrate, the complexity of a frame to be rendered or the current resources available to render a given frame may result in the rendering an preparation of the frame taking more time than is available at the nominal current frame rate, and thus the system can instead utilize dynamically and temporarily adjust the frame period for the render-delayed frame. However, because the frame period for a first frame may differ from the frame period for a second frame adjacent to the first frame in a variable refresh rate configuration, there is potential for the effective duty cycle of the EM signal 138 during the frame period for the first frame to differ from the effective duty cycle of the EM signal 138 during the frame period for the second frame, which in turn leads to a change in brightness from the first frame to the second frame, which could be detected by the viewer as distracting flicker.

Accordingly, in at least one embodiment, the timing controller 122 employs a discrete VRR scheme 144 that provides for the implementation of frame rates that permit alignment and synchronization of the corresponding frame periods to the PWM cycles of the EM signal 138 such that each frame period is aligned to a PWM cycle and spans only a PWM cycles in their entireties, and thus allows changes in the frame rate to accommodate a delayed rendering of a frame to avoid distortion of the effective duty cycle for that frame or frames preceding or following it. As used herein, "alignment" of frame periods to the EM signal 138 or "alignment" of frame periods to corresponding PWM cycles of the EM signal 138 refers to timing of each frame period so that that frame period commences at the same specified point in a corresponding PWM cycle and terminates at this same specified point in a subsequent corresponding PWM cycle. Embodiments of the discrete VRR scheme 144 are described below.

Figure 2:
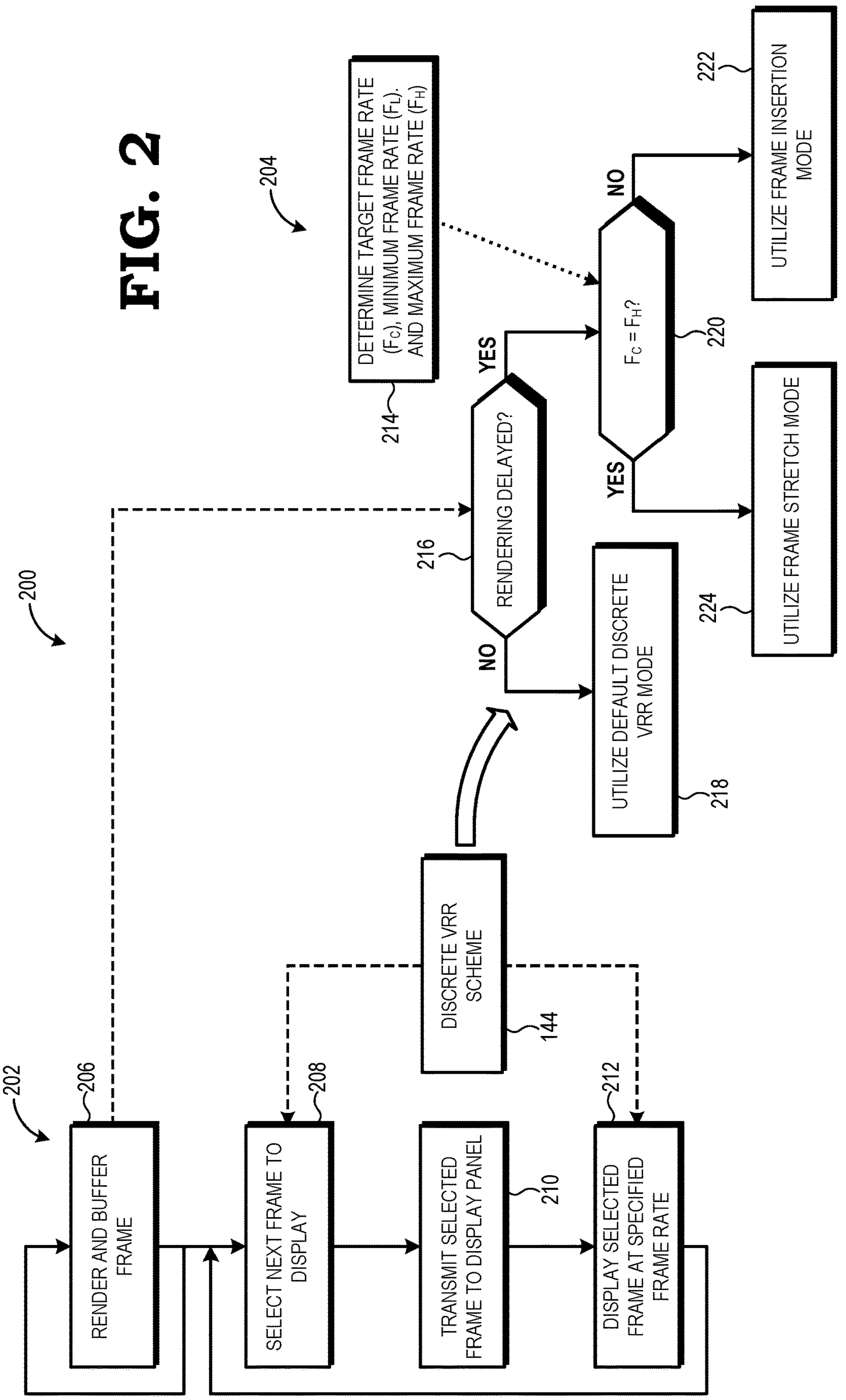
FIG. 2 is a flow diagram illustrating a method of displaying a sequence of frames with dynamic discrete VRR control mode switching in accordance with some embodiments.

FIG. 2 illustrates a method 200 of operation of the display system 100 of FIG. 1 in rendering and displaying a stream or other sequence of frames utilizing the discrete VRR scheme 144 in accordance with some embodiments. In the illustrated example, the method 200 is composed of two concurrent processes: a render/display process 202 for generating and displaying the sequence of frames and a frame selection process 204 (representative of the discrete VRR scheme 144) for selecting the appropriate frame rate, and in the event of a rendering-delayed frame, selecting the appropriate discrete VRR mode for compensating for the rendering-delayed frame.

An iteration of the render/display process 202 initiates at block 206, whereby the frame generation subsystem 102 renders a frame 132 and buffers the frame 132 in the GRAM 118. At block 206, the timing controller 122 (or other component of the display control subsystem 104) selects the next frame to be provided to the display panel 106 for display. At block 210, the timing controller 122 and the pixel driver 120 coordinate to transfer the pixel data of the selected frame 132 from the GRAM 118 to the display panel 106 via the SCAN signal 142, and at block 212 the display panel 106 displays the selected frame 132 at a specified frame rate with a brightness controlled at least in part on the effective PWM duty cycle of the EM signal 138 over the frame period corresponding to the specified frame rate. In some embodiments, the display panel 106 begins the display of already-received rows of pixels of the selected frame 132 while subsequent rows are still being transferred. In other embodiments, the entirety of the selected frame 132 is transmitted to the display panel 106 before display of the frame 132 is initiated.

As noted above, an iteration of the render/display process 202 includes selection of the next frame to display (block 208) and specification of the frame rate, and thus the frame period, at which the selected frame is to be displayed (block 212). In one embodiment, these two aspects are controlled in accordance with the discrete VRR scheme 144 employed by the timing controller 122 of the display control subsystem 104 and represented by the frame selection subprocess 204. As a general overview of the discrete VRR scheme 144, in the absence of a rendering-delayed frame, a default VRR mode is employed in which the next frame to be selected for display is the most recently rendered frame as is typical. However, in the presence of a rendering-delayed frame, alternative VRR modes can be employed to compensate for the delayed rendering in a manner that avoids distortion of the per-frame-period PWM duty cycle of the EM signal 138.

As described above, one aspect facilitated by the discrete VRR scheme 144 is the alignment of frame periods to edges of the PWM cycles of the EM signal 138 so that any given frame period does not distort the intended duty cycle of the EM signal 138.

As part of this alignment process, at block 214 the timing controller 122 is initialized in part by determining a maximum frame rate (denoted herein as "$F_H$"), a minimum frame rate (denoted herein as "$F_L$") and a target frame rate (denoted herein as "$F_C$"). These frame rates may be defined in part by the frame rendering capacity of the frame generation subsystem 102, the display frame rate capacities of the display panel 106, based on user settings or preferences, based on requirements of the software application 110, and the like. As one example, the maximum frame rate $F_H$ could be set to the maximum display frame rate supported by the display panel 106 or the software application 110 (e.g., 120 frames-per-second (fps)) while the minimum frame rate $F_L$ could be set to the lowest frame rate deemed to provide a viewing experience of minimum sufficient quality (e.g., 30 fps). The target frame rate $F_C$ represents a target frame rate between the minimum and maximum frame rates (that is, $F_L \Leftarrow F_C \Leftarrow F_H$) and is selected based on one or more considerations, including user preferences or settings, current rendering bandwidth capacity, and the like.

Further, as described below, the current frame rate $F_C$ is limited to a subset of the possible frame rates between $F_L$ and $F_M$ that meet certain criteria based on the number of PWM cycles in a given frame period, $F_L$ and $F_M$, and the like. For example, as described in greater detail below, to facilitate alignment of frame periods to the PWM cycles of the EM signal 138, in at least one embodiment, the maximum frame rate $F_H$, the minimum frame rate $F_L$, and the target frame rate $F_C$ each is selected from only those candidate frame rates that represent integer divisors of the PWM frequency of the EM signal 138; that is, the integer PWM frequency is dividable by the integer candidate frame rates without remainder. To illustrate, assume the PWM frequency is 360 hertz and the actual maximum frame rate supported by the display system 100 is 130 fps. In this case, 130 is not an integer divisor of 360, but 120 is the closest integer divisor of 360, and thus 120 fps is selected as the maximum frame rate. In doing so, the corresponding frame periods at any of the maximum, minimum, or target frame rates have durations equal to integer multiples of the PWM cycles/periods of the EM signal 138, and thus facilitating alignment of the frame periods to the EM signal 138.

With the timing controller 122 so initialized, at block 216 of the frame selection process 204 the timing controller 122 monitors the frame rendering process of block 206 for an indication that rendering of the current frame is, or will be, "delayed"; that is, the rendering of the current frame is taking sufficiently long that the current frame may or will not be ready for scan out to the display panel 106 (block 210) when the frame period for the previous frame (that is, the frame currently being displayed) ends and the frame period for the next frame to be displayed begins. To illustrate, in some embodiments, a specified signal is provided by the frame generation subsystem 102 to signal completion of rendering of a frame, such as through transmission of a 2C data packet. For a given frame rate, this signal is provided within a specified delay following assertion of the TE signal 136. As such, failure to receive this specified signal within the corresponding delay following assertion of the TE signal 136 indicates that rendering of the frame is delayed.

In the absence of an indication of a late/delayed rendering for the current frame being rendered (e.g., in response to determining that the current frame has finished rendering by a certain time or threshold associated with the target frame rate), then at block 218 the timing controller 122 utilizes a default discrete VRR mode for the upcoming display frame period. When the timing controller 122 is in the default discrete VRR mode, the most-recently-rendered frame is selected for block 208 as the next image to be displayed and the frame rate for the rendered frame is set to the selected target frame rate for block 212, and thus the frame period for displaying the rendered frame is set to the target frame period corresponding to the target frame rate. That is, in response to determining at block 216 that the frame being rendered will be rendered and ready in time, the display control subsystem 104 is set to the discrete VRR mode so that this frame is selected as the next frame to be scanned out to the display and the nominal target frame rate is utilized for the timing and control signals for displaying that frame at the display panel 106. The default discrete VRR mode is described in greater detail below with reference to FIG. 3.

Returning to block 216, if the timing controller 122 instead detects delayed rendering for the current frame, then in one embodiment the discrete VRR scheme 144 selects one of two compensatory discrete VRR modes to compensate for the delayed rendering while maintaining the same effective PWM duty cycle for each frame period for at least a subset of frame period coincident with the delayed frame rendering and thus mitigating the presence of flicker associated with the delayed rendering. These two modes include a frame stretch mode and a frame insertion mode. As described in greater detail below, the frame stretch mode can be utilized even when the current frame rate is set to the maximum frame rate (that is, when $F_C \Leftarrow F_H$), whereas the frame insertion mode is implementable only when the current frame rate is less than the maximum frame rate (that is, when $F_C < F_H$). Thus, for the purposes of the following example, it is assumed that the frame stretch mode is implemented when the current frame rate is equal to the maximum frame rate, and further that the frame insertion mode is implemented whenever the current fame rate is less than the maximum frame rate. However, in other embodiments, further selection criteria can be used to select between the frame stretch mode or the frame insertion mode when the current frame rate is less than the maximum frame rate. Further, in other embodiments, only a single compensatory discrete VRR mode is available when a delayed rendering situation is detected. For example, the display control subsystem 104 may implement only the frame insertion mode to compensate for detected rendering delays and thus limit the current frame rate to a nominal frame rate less than the maximum frame rate $F_H$. As another example, the display control subsystem 104 may implement only the frame stretch mode to compensate for delayed rendering situations.

With the illustrated embodiment, in response to detecting a delayed rendering, at block 220 the timing controller 122 determines whether the current frame rate is set to the maximum frame rate (whether $F_C = F_H$). If not, then the timing controller 122 utilizes the frame insertion mode at block 222 to control the timing and display of the upcoming display frame period. As an overview, when in the frame insertion mode, the most-recently-displayed frame (that is, the "previous" frame) is selected again at block 208 as the next frame to displayed and for the repeated display of this previous frame at block 212, a faster frame rate (e.g., the maximum frame rate $F_H$) is selected so that the corresponding display frame period for the again-displayed previous frame is shortened compared to the nominal target frame period, while remaining aligned with the pulses of the EM signal 138, and then the rendering-delayed frame is selected for display (block 208) for the following display frame period, and displayed at the target frame rate (block 212). The frame insertion mode is described in greater detail below with reference to FIGS. 4 and 5.

Returning to block 220, if the current frame rate is equal to the maximum frame rate, then the timing controller 122 utilizes the frame stretch mode at block 224 to control the timing and display of the upcoming display frame period. As a general overview, when in the frame stretch mode, the rendering-delayed frame is selected at block 208 to be the next frame to be displayed and for the display of the rendering-displayed frame at block 212, a "slower" frame rate is selected so that the corresponding display frame period for the rendering-delayed frame is "stretched" compared to the target frame period, while also being aligned with the pulses of the EM signal 138. The frame stretch mode is described in greater detail below with reference to FIGS. 6 and 7.

Figure 3:
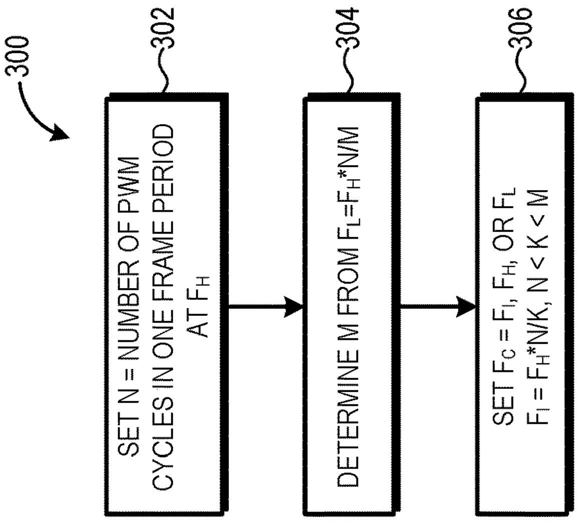
FIG. 3 is a flow diagram illustrating a method of setting a target frame rate for a default discrete VRR control mode in accordance with some embodiments.

Turning now to FIG. 3, a method 300 representing the default discrete VRR mode is illustrated in accordance with some embodiments. As noted above, the discrete VRR scheme 144 implemented by the display control subsystem 104 seeks to mitigate duty cycle distortion in the PWM-based brightness control signal (that is, the EM signal 138) by aligning each display frame period with the PWM cycles of the brightness control signal (EM signal 138) so that each such display frame period maintains the same effective PWM duty cycle over its duration for the same given intended brightness level for the display of the corresponding frame. Accordingly, in at least one embodiment, the frame rate, and thus frame period, selected and implemented for any given frame being displayed is set so that each frame period commences at the same point within a corresponding PWM cycle of the brightness control signal and has a duration that is an integer multiple of the PWM period of the brightness control signal. That is:

$$\text{FramePeriod}(X)=Y*\text{PWMPeriod}$$

where X is a given frame X, FramePeriod(X) is the frame period for frame X, PWMPeriod is the PWM period of the PWM cycles of the brightness control signal, and Y is an integer number.

Accordingly, at block 302 the timing controller 122 determines the number of complete PWM cycles that occur within one frame period at the maximum frame rate $F_H$, wherein the maximum frame rate $F_H$ is selected or set as a frame rate that is an integer multiple of the PWM frequency of the EM signal 138, and sets a variable N to this determined number. As such, the maximum frame rate $F_H$ can be set based on a specified PWM frequency of the EM signal 138, the PWM frequency of the EM signal 138 can be set based on a specified maximum frame rate $F_H$, or a combination thereof. Likewise, the minimum frame rate $F_L$ is set to an integer multiple of the PWM frequency of the EM signal 138. It will be appreciated that the higher number N of complete PWM cycles within one frame period, the greater the frequency that can be provided by the timing controller 122 with finer resolution. At block 304, a variable M is determined using N, the maximum frame rate $F_H$, and the minimum frame rate $F_L$ based on the relationship:

$$F_L = F_H * \frac{N}{M} \text{ or } M = \frac{F_H * N}{F_L}$$

At block 306, the target frame rate $F_C$ is then set to a frame rate that will result in a frame period that is an integer multiple of the PWM period of the EM signal 138. As such, rather than setting the target frame rate $F_C$ to any frame rate between $F_L$ and $F_M$, the target frame rate $F_C$ is limited to a frame rate that results in a frame period that is an integer multiple of the PWM period of the EM signal 138 (i.e., a frame rate that is an integer divisor of the integer PWM frequency of the EM signal 138). Frame rates meeting this requirement are referred to herein as "discrete" frame rates. With reference to $F_L$, $F_M$, and M determined as described above, the target frame rate $F_C$ is set as one of $F_L$, $F_M$, or $F_I$, where $F_I$ is a discrete frame rate defined as:

$$F_I = F_H * \frac{N}{K}, N < K < M$$

To illustrate the process of method 300, assume that the maximum frame rate is set to 120 fps ($F_M$=120), the minimum frame rate is set to 60 fps ($F_L$=60), and the PWM frequency of the EM signal 138 is 360 PWM cycles per second (N=360/120=3). Accordingly, in this example, M would be set to 6 (120*3/60). Accordingly, K can be selected as one of the integer values 4 or 5, and thus the candidate set of discrete frame rates from which the target frame rate can be selected is: 60 fps, 72 fps, 90 fps, or 120 fps (each of which is an integer divisor of the PWM frequency of 360). A frame period at one of these frame rates will thus span an integer number of PWM cycles of the EM signal 138, and if each such frame period is aligned to start at the same point within a corresponding PWM cycle (e.g., at the rising edge of the high pulse in the PWM cycle), then the effective duty cycle of the EM signal 138 for each frame period remains the same, thereby avoiding distortion of the effective duty cycle of the EM signal 138 from one display frame to the next display frame.

Figure 4:
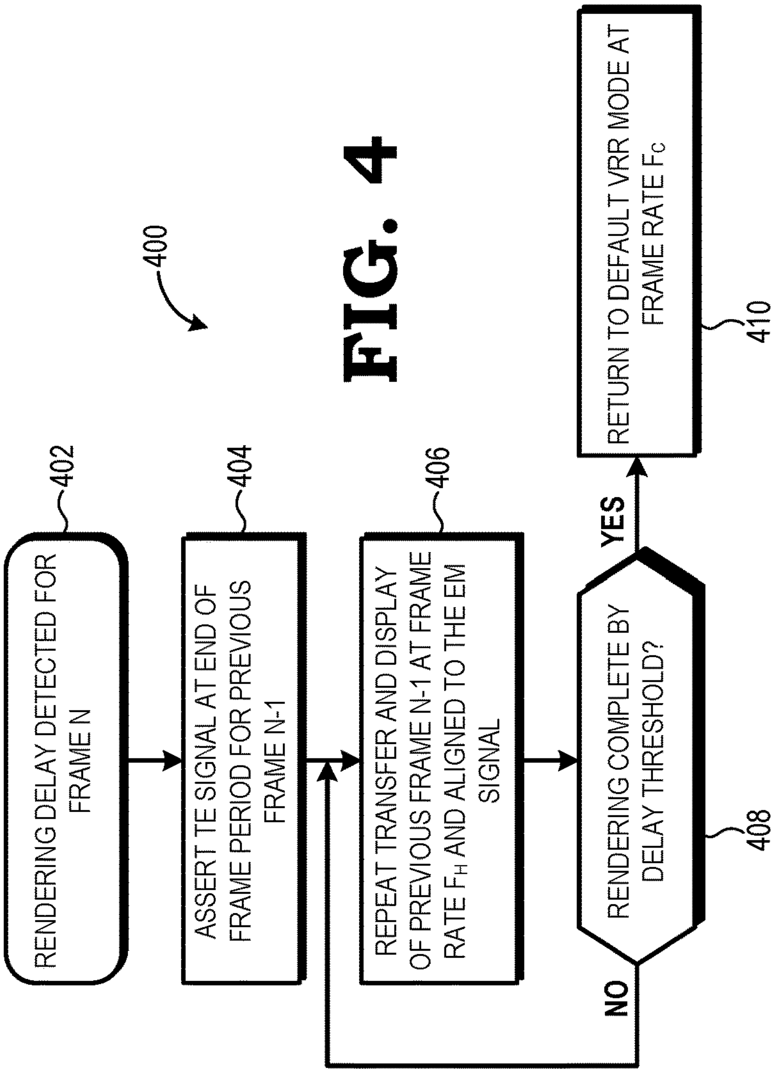
FIG. 4 is a flow diagram illustrating a method of compensating for a delayed frame rendering using a frame insertion mode in accordance with some embodiments.

FIG. 4 illustrates a method 400 depicting operation of the frame insertion mode for compensating for delayed rendering in accordance with some embodiments. The method 400 is initiated at block 402, which represents detection of a delay in the completion of rendering of the frame 132 currently being rendered by the GPU 114 ("frame N" for purposes of the following description) at block 216 of method 200 (FIG. 2) described above, and selection of the frame insertion mode when there are multiple compensatory discrete VRR modes. As the frame insertion mode involves re-inserting the previously-displayed frame (frame "N−1" for purposes of the following description), which is the frame rendered immediately prior to rendering of the current frame N, so that it is displayed again, at block 404 the timing controller 122 asserts the TE signal 136 (assuming active high) at the end of the current display system so as to signal to the frame generation subsystem 102 to temporarily refrain from transferring pixel data from the rendering-delayed frame N to the GRAM 118 (and thus overwriting the previous frame N−1 stored therein). For the next frame period, at block 406 the timing controller 122 and pixel driver 120 together repeat the scan transfer of the previous frame N−1 (block 210, FIG. 2) to the display panel 106 and display the previous frame N−1 once again (block 212) at the maximum frame rate $F_H$ (or some other discrete frame rate greater than the target frame rate $F_C$), with the frame period for this repeated frame N−1 aligned to the same point (e.g., the rising edge) of a corresponding PWM cycle of the EM signal 138.

As this next frame period concludes, at block 408 the timing controller 122 determines if the rendering of the current frame N has finished or will finish in sufficient time to be used for the following frame period. If so, then at block 410 the timing controller 122 switches back to the default discrete VRR mode, in which the current frame N is selected for scan out to the display panel 106 (block 210) and then displayed at the target discrete frame rate $F_C$ with the corresponding frame period aligned to the PWM cycles of the EM signal 138 as described above. However, if the rendering of frame N has not finished in time, then at a second iteration of block 406 the timing controller 122 again selects the previous frame N−1 for scan out and display for a third time at the maximum frame rate $F_H$ or other higher discrete frame rate. This process then repeats until either rendering of the current frame N has completed and thus ready for scan out and display, or until the number of re-insertions of the previously displayed frame N−1 for repeated display has met a threshold.

Figure 5:
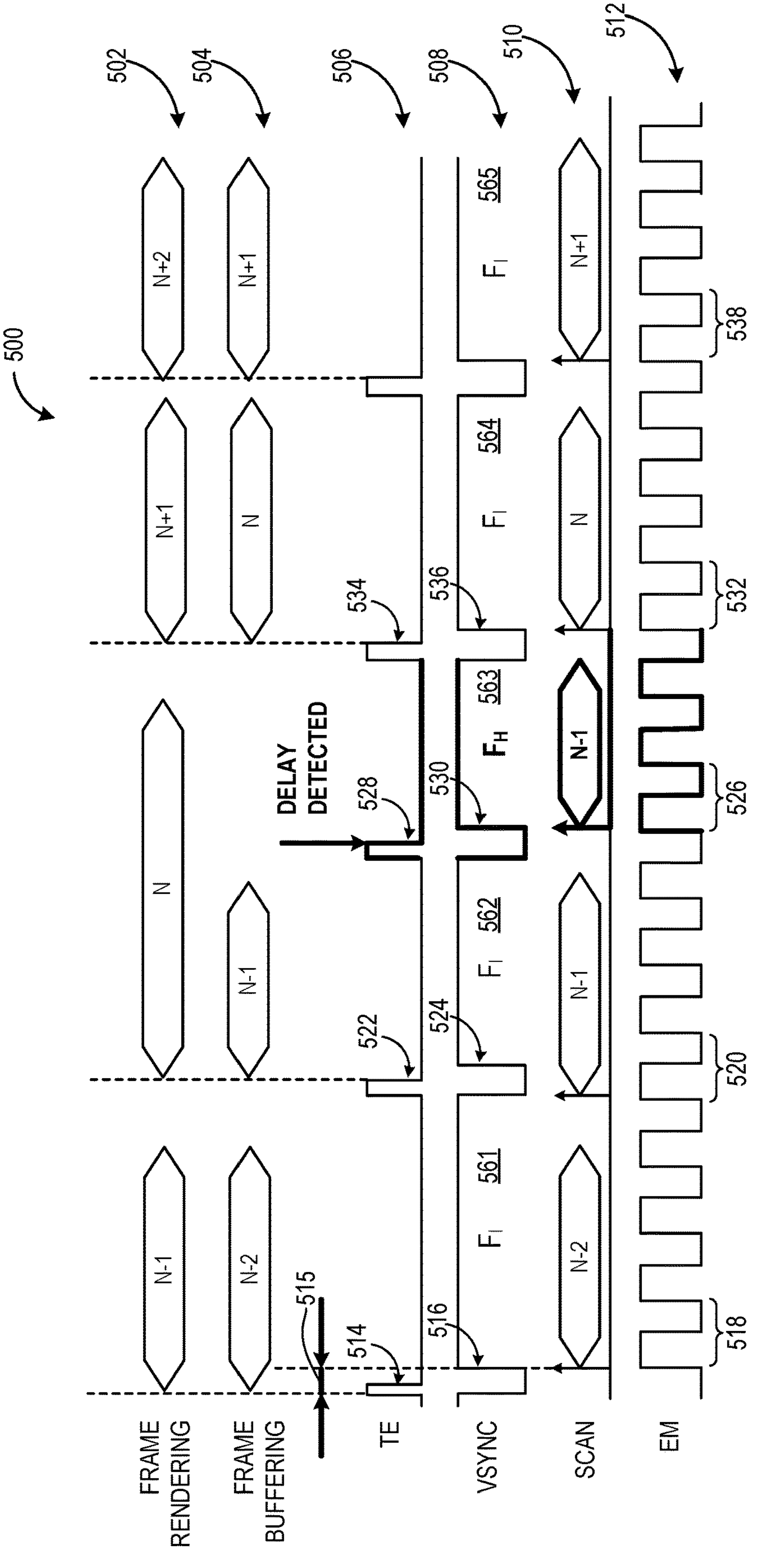
FIG. 5 is a timing diagram illustrating an example of the frame insertion mode of FIG. 4 in accordance with some embodiments.

FIG. 5 depicts a timing diagram 500 illustrating an example of entry into the frame insertion mode in response to a rendering delay in accordance with some embodiments. For timing diagram 500, the abscissa represents time (increasing from left to right). Timing row 502 represents the rendering process by the GPU 114 (FIG. 1) for each corresponding frame, starting with frame N−1 and ending with frame N+2. Timing row 504 represents the buffering process for transferring the rendered frame data for a frame from the frame generation subsystem 102 to the GRAM 118. Timing row 506 represents the state of the TE signal 136, whereby in this example an active-high pulse in the TE signal 136 signals the frame generation subsystem 102 to begin transferring the next rendered frame to the GRAM 118. Timing row 508 represents the state of a vertical blank (VSYNC) signal generated and used by the timing controller 122 to control the scan out of a frame from the GRAM 118 to the display panel 106 for display, and thus the VSYNC signal represents the timing of each frame period. For this example, the VSYNC signal is synchronized to the active-high pulses in the TE signal 136, whereby the VSYNC signal is pulsed active-low in response to a corresponding pulse in the TE signal 136, and this pulse in the VSYNC signal initiates commencement of the frame period for the corresponding frame being scanned out and displayed at the display panel 106. Timing row 510 represents the scan out of a frame on a row-by-row basis for a corresponding frame period (represented in the VSYNC signal). Timing row 512 represents the PWM-based EM signal 138. For this example, $F_H$=120, $F_L$=60, and the PWM frequency is 360 hertz. As such, N=3 (that is, the frame period at frame rate $F_H$ is equal to three complete PWM cycles of the EM signal 138), and therefore M=6 and K=4 or 5. Consequently, the candidate frame rates available for selection are 60 fps, 72 fps, 90 fps, or 120 fps so as to ensure that each frame period is an integer multiple of the PWM period of the EM signal 138. For purposes of the following example, the target frame rate is set to 90 fps (that is, $F_C$=$F_I$=90 fps).

The timing diagram 500 starts with the transfer of the pixel data for frame N−2 into the GRAM 118 in response to the first pulse (pulse 514) in the TE signal 136. Concurrently, the GPU begins rendering of frame N−1. At the end of the first pulse (pulse 516) in the VSYNC signal, the timing controller 122 and pixel driver 120 begin the scan out and display of frame N−2 for frame period 561 at a frame rate $F_C$ (=90 fps). Note that the delay 515 between the end of the first pulse 514 in the TE signal 136 and the end of the first pulse 516 in the VSYNC signal represents the delay between when a frame 132 is buffered in the GRAM 118 and when that same frame 132 can start scan out to the display panel 106. As shown, the end of this first pulse 516 in the VSYNC signal, and thus the start of the frame period 561, is aligned with the rising edge of the corresponding PWM cycle 518 of the EM signal 138, and with a frame period of $1/90^{th}$ of a second and a PWM period of $1/360^{th}$ of a second, the frame period 561 spans four PWM cycles, from the rising edge of the first PWM cycle 518 to the rising edge of a fifth PWM cycle 520. Similarly, as shown in timing diagram 500, rendering of frame N−1 completes on time, and thus with the second pulse 522 in the TE signal 136, the pixel data of rendered frame N−1 is transferred to the GRAM 118, and the VSYNC signal is pulsed for a second pulse 524 to start the next frame period 562 for scan out and display of the frame N−1 at the target frame rate $F_C$, with the frame period 562 aligned to the rising edge of the fifth PWM cycle 520, spanning four complete PWM cycles, and ending with the rising edge of the ninth PWM cycle 526.

However, with the conclusion of the second frame period 562 and the corresponding third pulse 528 of the TE signal 136 so as to trigger the third frame period 563, as represented in timing row 502, the rendering of frame N has not completed in time; that is, frame N is a rendering-delayed frame. As such, frame N is not ready for use for display at the third frame period 563. Accordingly, the timing controller 122 switches to the frame insertion mode in response to detecting the delayed rendering (and with the target discrete frame rate being less than the maximum frame rate). Thus, in the frame insertion mode, the timing controller 122 instead returns to the previously-displayed frame, frame N−1, and with the start of the third frame period 563 signaled by a third pulse 530 in the VSYNC signal (and aligned to the rising edge of the third PWM cycle 526), the timing controller 122 and pixel driver 120 coordinate to again scan out the previous frame N−1 from the GRAM 118 to the display panel 106 for display at the display panel 106. However, rather than display the second iteration of frame N−1 at the target discrete frame rate $F_C$, the timing controller 122 instead selects a faster frame rate, such as the maximum frame rate $F_H$, and thus having a shorter frame period 563 of three PWM cycles of the EM signal 138 in this example. By displaying the repeated frame at a faster frame rate, the display system 100 can more quickly turn to displaying the rendering-delayed frame N following completion of its rendering. However, as with the preceding frame periods 561 and 562, the frame period 563 is aligned with the rising edge of the corresponding PWM cycle (PWM cycle 526 in this case) and spans an integer number of PWM cycles (3 in this example) so as to terminate at the rising edge of a twelfth PWM cycle 532.

In this example, the GPU 114 completes rendering of frame N before the end of the third frame period 563. Accordingly, with termination of the third frame period 563, the GPU begins rendering frame N+1 and frame N is transferred to the GRAM 118 in response to the fourth pulse 534 in the TE signal 136, which in turn triggers a fourth frame period 564 aligned with a fourth pulse 536 in the VSYNC signal (which in turn is aligned with the rising edge of the twelfth PWM cycle 532 of the EM signal 138). Accordingly, frame N is scanned out from the GRAM 118 and displayed at the display panel 106 during the fourth frame period 564, which has a frame rate set to $F_C$ as there is no delayed rendering condition currently present. The fourth frame period is aligned to the rising edge of the twelfth PWM cycle 532 and spans four complete PWM cycles, terminating with the rising edge of the sixteenth PWM cycle 538. This process repeats for a fifth frame period 565 for displaying frame N+1 while frame N+2 is rendered, and so forth. In the event that the GPU 114 had not completed rendering of frame N by the end of the third frame period 563, then a third instance of the frame N−1 could be displayed for a second inserted frame period at the faster frame rate $F_M$, and this process of reusing frame N−1 could be repeated until the rendering of frame N has completed, or until a threshold number of repeat uses of a frame is met.

As illustrated by timing diagram 500, in accordance with the default discrete VRR mode, non-delayed frames are rendered at a discrete frame rate that results in frame periods that are integer multiples of the PWM period of the EM signal 138, and thus allowing each frame period to align with the PWM cycles of the EM signal 138 so that the effective duty cycle of the EM signal 138 is constant between frame periods. Moreover, when there is a delayed frame, entry into the frame insertion mode allows use of a previous frame to be displayed at a faster rate while waiting for the delayed frame to become ready for display. The use of discrete frame rates (that is, frame rates that result in frame periods that are integer multiples of the PWM period) thus allows a shorter frame period to be used for this inserted frame, while still allowing this shorter frame period to align to the same point in a PWM cycle as the other frame periods and to span an integer number of PWM cycles, and thus maintain the same effective PWM duty cycle for this inserted/repeated frame as the frames that precede and follow it, thereby mitigating any flicker that otherwise would be perceived by insertion of this repeated frame to compensate for the delayed-rendering of frame N.

Figure 6:
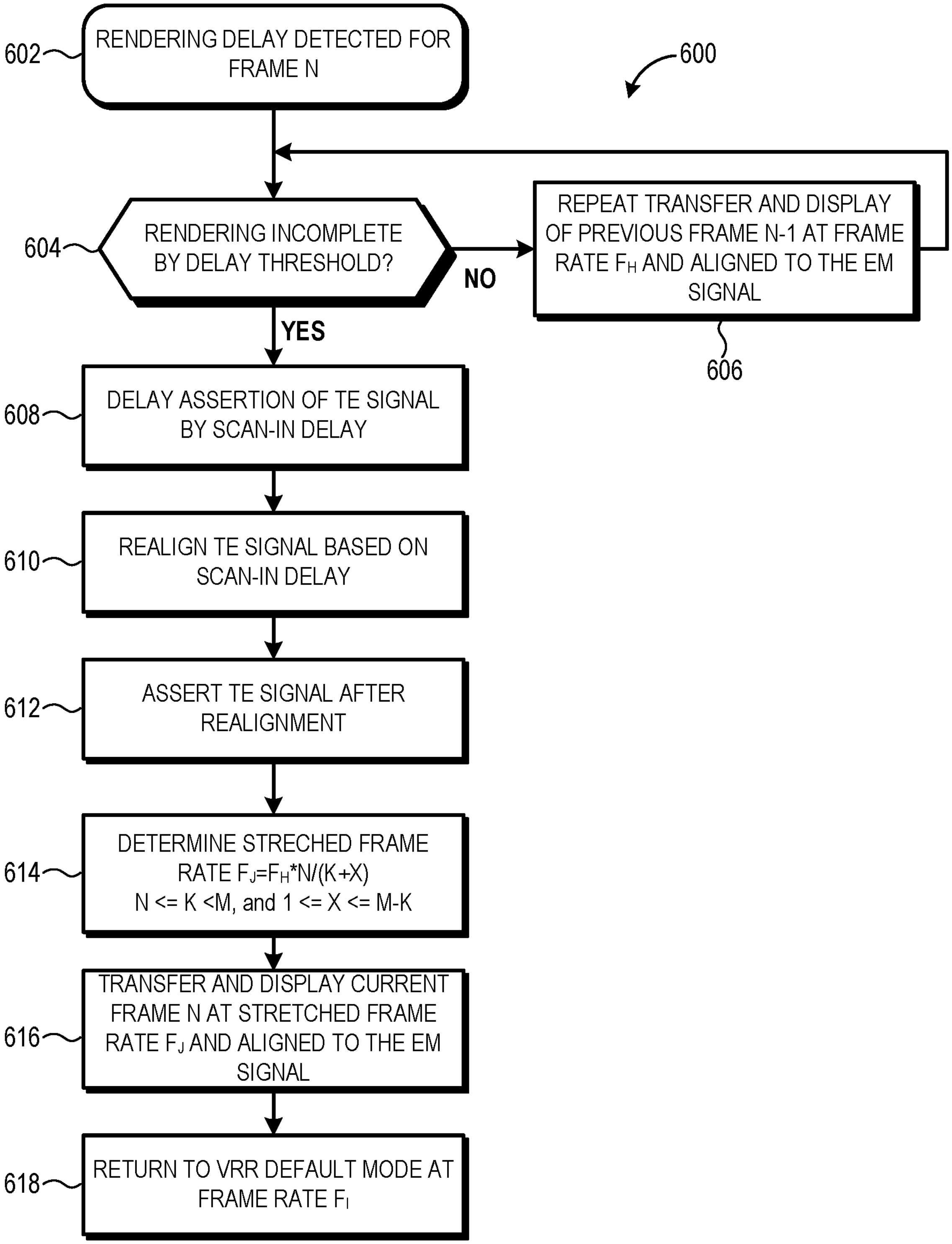
FIG. 6 is a flow diagram illustrating a method of compensating for a delayed frame rendering using a frame stretch mode in accordance with some embodiments.

Turning to FIG. 6, a method 600 illustrating an implementation of the frame stretch method is shown in accordance with some embodiments. The method 600 is initiated at block 602, which represents detection of a delay in the completion of rendering of the frame 132 currently being rendered by the GPU 114 ("frame N" for purposes of the following description) at block 216 of method 200 (FIG. 2) described above, and selection of the frame stretch mode when there are multiple compensatory discrete VRR modes. With a delayed rendering situation detected, at block 604 the timing controller 122 monitors the progress of the rendering of frame N. If the rendering exceeds a specified delay threshold that indicates that rendering of the frame N will not be completed in time to use the frame N for the next frame period, then at block 606 the timing controller 122 and pixel driver 120 together repeat the scan transfer of the previous frame N−1 (block 210, FIG. 2) to the display panel 106 and display the previous frame N−1 once again (block 212) at the maximum frame rate $F_H$ (or some other discrete frame rate greater than the target frame rate $F_C$) for the next frame period, with the frame period for this repeated frame N−1 aligned to the same point (e.g., the rising edge) of a corresponding PWM cycle of the EM signal 138.

Otherwise, in the event that rendering of frame N will complete in time, rather than pulse or assert the TE signal 136 at the end of the current frame period so start the next frame period, at block 608 the timing controller 122 delays assertion of the TE signal 136 by a delay period equal to, or otherwise based on, a scan-in delay of the display system 100, where the scan-in delay represents the delay between when the display control subsystem 104 can receive a frame in the GRAM 118 and when that same frame can be scanned out to the display panel 106. Shifting assertion of the TE signal 136 by this scan-in delay provides additional time for the GPU 114 (FIG. 1) to complete rendering of the rendering-delayed frame before the start of the next display frame period. The scan-in delay can be calculated as described in the following paragraph. As represented by block 610, this shift to the TE signal 136 is not a temporary shift, but instead represents a permanent realignment of the timing of the TE signal 136; that is, until another delayed rendering causes a subsequent shift from the default discrete VRR mode to a compensatory discrete VRR mode, all subsequent assertions or pulses of the TE signal 136 are aligned at the target frame rate to the now-delayed TE assertion of block 612.

In anticipation of the upcoming display frame period, at block 614 the timing controller determines a stretched frame rate, and thus a stretched frame period, to be used to display the rendering-delayed frame and so as to re-align the timing of subsequent display frame periods. In at least one embodiment, this process is represented by the following expressions:

$$F_J = F_H * \frac{N}{K+X} N \le K < M,\ 1 \le X < M - K$$

$$ScanIn = \frac{1}{F_H * N * X} + ICPros$$

where $F_J$ represents the stretched frame rate, $F_H$ represents the maximum frame rate, N represents the number of PWM cycles in a frame period at the maximum frame rate, K and X are integers, ICPros represents the minimum time required by the display control subsystem 104 to receive, process, and output pixel data, and ScanIn represents the scan-in delay utilized to delay assertion of the TE signal 136 at block 608. Note that through selection of K and X given the above-identified constraints, the stretched frame rate $F_J$ results in a frame period that is an integer multiple of the PWM period of the EM signal 138, and thus allowing PWM cycle alignment of the resulting display frame period.

When the TE signal 136 is then asserted after the injected scan-in delay (as represented by block 612), at block 616 the timing controller 122 and the pixel driver 120 scan out and display the now-completed frame N during the corresponding display frame period at the stretched frame rate $F_J$ and with this display frame period aligned so as to span a set of whole, or complete, PWM cycles of the EM signal 138. As represented by block 618, after displaying the rendering-delayed frame N during the stretched frame period, the timing controller 122 then returns to the default discrete VRR mode for displaying the next rendered frame at the target frame rate $F_C$ (unless the next rendered frame is render-delayed as well). As a result of the process of stretching the frame period for the rendering-delayed frame by an amount equal to, or otherwise based on, a scan-in delay, the timing controller 122 is able to "correct" or "realign" the timing between the TE signal 136, the rendering of frames, and frame periods following the stretched frame period.

Figure 7:
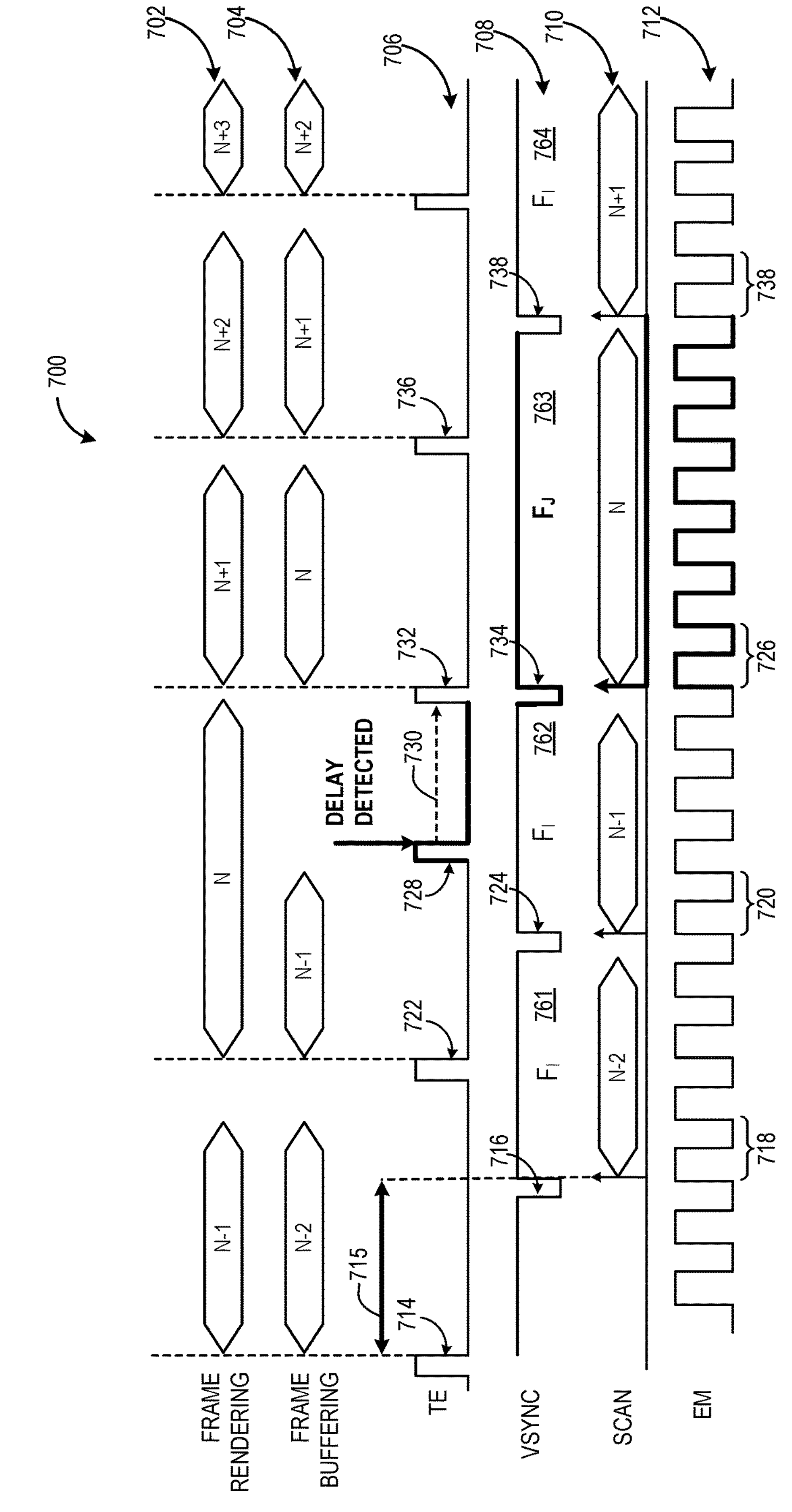
FIG. 7 is a timing diagram illustrating an example of the frame stretch mode of FIG. 6 in accordance with some embodiments.

FIG. 7 depicts a timing diagram 700 illustrating an example of entry into the frame stretch mode in response to a rendering delay in accordance with some embodiments. For timing diagram 700, the abscissa represents time (increasing from left to right). Timing row 702 represents the rendering process by the GPU 114 (FIG. 1) for each corresponding frame, starting with frame N−1 and ending with frame N+3. Timing row 704 represents the buffering process for transferring the rendered pixel data for each frame from the frame generation subsystem 102 to the GRAM 118. Timing row 706 represents the state of the TE signal 136, whereby in this example an active-high pulse in the TE signal 136 signals the frame generation subsystem 102 to begin transferring the next rendered frame to the GRAM 118. Timing row 708 represents the state of the VSYNC signal generated and used by the timing controller 122 to control the scan out of a frame from the GRAM 118 to the display panel 106 for display. For this example, the VSYNC signal is synchronized to the active-high pulses in the TE signal 136, whereby the VSYNC signal is pulsed active-low in response to a corresponding pulse in the TE signal 136, and this pulse in the VSYNC signal initiates commencement of the frame period for the corresponding frame being scanned out and displayed at the display panel 106. Timing row 710 represents the scan out of a frame for a corresponding frame period (represented in the VSYNC signal). Timing row 712 represents the PWM-based EM signal 138. As with the example of FIG. 5, for this example, $F_H$=120, $F_L$=60, and the PWM frequency is 360 hertz. As such, N=3 (that is, the frame period at frame rate $F_H$ is equal to three complete PWM cycles of the EM signal 138), and therefore M=6 and K=4 or 5. Consequently, the candidate frame rates available for selection are 60 fps, 72 fps, 90 fps, or 120 fps so as to ensure that each frame period is an integer multiple of the PWM period of the EM signal 138. For purposes of the following example, the target discrete frame rate is set to 90 fps (that is, $F_C$=90).

The timing diagram 700 starts with the transfer of the pixel data for frame N−2 into the GRAM 118 in response to a first pulse (pulse 714) in the TE signal 136. Concurrently, the GPU begins rendering of frame N−1. At the end of a corresponding first pulse (pulse 716) in the VSYNC signal, the timing controller 122 and pixel driver 120 begin the scan out and display of frame N−2 for frame period 761 at a frame rate $F_C$ (=90 fps). Note that the delay 715 between the end of the first pulse 714 in the TE signal 136 and the end of the first pulse 716 in the VSYNC signal represents the scan-in delay utilized in the frame stretch mode as described above, and is illustrated as having a greater magnitude than the scan-in delay 515 depicted in timing diagram 500 for purposes of illustration.

The end of this first pulse 716 in the VSYNC signal, and thus the start of the frame period 761, is aligned with the rising edge of the corresponding PWM cycle 718 of the EM signal 138, and with a target frame rate $F_C$ of 90 fps and thus a frame period of 1/90 seconds, and with a PWM period of 1/360 seconds, the frame period 761 spans four PWM cycles, from the rising edge of the first PWM cycle 718 to the rising edge of a fifth PWM cycle 720. Similarly, rendering of frame N−1 completes on time, and thus with the second pulse 722 in the TE signal 136, the pixel data of rendered frame N−1 is transferred to the GRAM 118, and the VSYNC signal is pulsed for a second pulse 724 following the pulse 722 in the TE signal 136 by the scan-in delay 715 to start the next frame period 762 for scan out and display of the frame N−1 at the frame rate $F_C$, with the frame period 762 aligned to the rising edge of the fifth PWM cycle 720, spanning four complete PWM cycles, and ending with the rising edge of the ninth PWM cycle 726.

However, in this example, the rendering of frame N is delayed, and thus when the TE signal 136 otherwise would pulse (pulse 728) so as to trigger a third frame period, the timing controller 122 detects the delayed rendering of frame N, and thus enters the frame stretch mode for frame N. Accordingly, the timing of the next pulse (pulse 732) in the TE signal 136 is shifted by an amount 730 equal to, or otherwise based on, the scan-in delay 715 so that the next pulse 732 is timed to occur in alignment with a corresponding pulse 734 in the VSYNC signal (which is itself aligned to the rising edge of the PWM cycle 726) that serves to terminate the second frame period 762 and start a third frame period 763. This shift amount 730 in the timing of the next pulse in the TE signal 136 serves to delay the frame generation subsystem 102 from attempting to scan in pixel data for frame N until the display frame period for frame N−1 has completed. However, this shift also has resulted in a misalignment of the timing of the VSYNC signal relative to the TE signal 136.

Accordingly, for the third frame period 763, the timing controller 122 calculates a stretch frame rate $F_J$ using the process described above that results in correction in the alignment between the TE signal 136 and the VSYNC signal at the conclusion of the resulting stretch frame period (frame period 763). In particular, the stretch frame period is set as the sum of the effective frame period at the target discrete frame rate $F_C$ (4 PWM cycles in this example) and the period represented by the scan-in delay (as an integer multiple of the PWM period), which is two PWM cycles in this example, for a stretched frame period of 6 PWM cycles, or a stretched frame rate $F_J$ of 60 fps. Accordingly, the subsequent pulse 736 in the TE signal 136 to initiate the buffering of the pixel data for rendered frame N+1 is followed by a corresponding pulse 738 in the VSYNC signal to end the third frame period 763 and start a fourth frame period 764, such that the timing or delay between the pulse 736 in the TE signal 136 and the following pulse 736 in the VSYNC signal is restored to the correct, previous timing relationship between these two signals that was present before the delay-rendered frame N. That is, by stretching the display frame period used to display a delay-rendered frame in the manner and by the amount described, the timing controller 122 is able to reestablish the correct alignment between the TE signal 136 and the VSYNC signal (representing the display frame timing) following the delay-rendered frame, and thus compensate for the delay introduced by the delayed-render frame, while maintaining consistent alignment between the frame periods and the PWM cycles of the EM signal 138 and thus avoiding or mitigating distortion of the PWM duty cycle for any of the frame periods. This in turn, avoids the introduction of flicker perceptible to the viewer.

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium can be in source code, assembly language code, object code, or other instruction format that is interpreted or otherwise executable by one or more processors.

A computer-readable storage medium includes any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

controlling a brightness of frames displayed at a display panel via pulse width modulation (PWM) of a brightness control signal provided to the display panel;

selecting, for display of frames at the display panel, a target frame rate that is between a minimum frame rate and maximum frame rate and which is an integer divisor of a PWM frequency of the brightness control signal so that a corresponding frame period for the target frame rate is an integer multiple of a PWM period of the brightness control signal; and providing frames for display based on the target frame rate such that a frame period of each frame is aligned with a corresponding PWM cycle of the brightness control signal.

2. The method of claim 1, further comprising:

detecting a delay in rendering of a first frame based on the target frame rate, and in response to detecting a delay in rendering of a first frame based on the target frame rate, implementing a compensatory variable refresh rate (VRR) scheme that maintains an effective PWM duty cycle of the brightness control signal for each display frame period of at least a subset of frame periods coincident with the delay in rendering.

3. The method of claim 2, wherein the compensatory VRR scheme comprises two different modes to compensate for a delay in rendering.

4. The method of claim 2, wherein implementing the compensatory VRR scheme includes implementing a frame insertion mode by:

displaying a second frame at the target frame rate for a first frame period, the second frame rendered immediately prior to the first frame;

responsive to detecting the delay in rendering of the first frame, providing the second frame for display again at a maximum frame rate for a second frame period that commences with termination of the first frame period and is an integer multiple of the PWM period of the brightness control signal; and displaying the first frame at the target frame rate for a third frame period that commences with termination of the second frame period.

5. The method of claim 2, wherein implementing the compensatory VRR scheme includes implementing a frame stretch mode by:

displaying a second frame at the target frame rate for a first frame period, the second frame rendered immediately prior to the first frame;

determining a scan-in delay that is an integer multiple of the PWM period and which represents a delay between scan in of a frame to a frame buffer and scan out of that frame from the frame buffer to the display panel;

responsive to detecting the delay in rendering of the first frame, providing the first frame for display for a second frame period that commences with termination of the first frame period and is equal to a sum of the first frame period and the scan-in delay; and displaying a third frame at the target frame rate for a third frame period that commences with termination of the second frame period.

6. The method of claim 1, wherein:

the display panel is a transmissive display panel and the brightness control signal is a backlight control signal for the transmissive display panel; or the display panel is an emissive display panel and the brightness control signal is an emission control signal for the emissive display panel.

7. A system comprising:

a frame rendering subsystem configured to render a sequence of frames at a variable rate; and a display control subsystem coupled to the frame rendering subsystem and coupleable to a display panel, the display control subsystem configured to:

provide a brightness control signal to the display panel, the brightness control signal configured to control a brightness of frames displayed at a display panel via pulse width modulation (PWM) of the brightness control signal;

select, for display of frames at the display panel, a target frame rate that is between a minimum frame rate and maximum frame rate and which is an integer divisor of a PWM frequency of the brightness control signal so that a corresponding frame period for the target frame rate is an integer multiple of a PWM period of the brightness control signal; and transmit frames to the display panel for display based on the target frame rate such that a frame period of each frame is aligned with a corresponding PWM cycle of the brightness control signal.

8. The system of claim 7, wherein the display control subsystem is further configured to:

in response to detecting a delay in rendering of a first frame based on the target frame rate, implement a compensatory variable refresh rate (VRR) scheme that maintains an effective PWM duty cycle of the brightness control signal for each display frame period of at least a subset of frame periods coincident with the delay in rendering.

9. The system of claim 8, wherein the compensatory VRR scheme comprises two different modes to compensate for a delay in rendering.

10. The system of claim 8, wherein the display control subsystem is to implement the compensatory VRR scheme by implementing a frame insertion mode, including:

displaying a second frame at the target frame rate for a first frame period, the second frame rendered immediately prior to the first frame;

responsive to detecting the delay in rendering of the first frame, providing the second frame for display again at a maximum frame rate for a second frame period that commences with termination of the first frame period and is an integer multiple of the PWM period of the brightness control signal; and displaying the first frame at the target frame rate for a third frame period that commences with termination of the second frame period.

11. The system of claim 8, wherein the display control subsystem is to implement the compensatory VRR scheme by implementing a frame stretch mode, including:

displaying a second frame at the target frame rate for a first frame period, the second frame rendered immediately prior to the first frame;

determining a scan-in delay that is an integer multiple of the PWM period and which represents a delay between scan in of a frame to a frame buffer and scan out of that frame from the frame buffer to the display panel;

responsive to detecting the delay in rendering of the first frame, providing the first frame for display for a second frame period that commences with termination of the first frame period and is equal to a sum of the first frame period and the scan-in delay; and displaying a third frame at the target frame rate for a third frame period that commences with termination of the second frame period.

12. The system of claim 7, further comprising:

the display panel, wherein:

the display panel is a transmissive display panel and the brightness control signal is a backlight control signal for the transmissive display panel; or the display panel is an emissive display panel and the brightness control signal is an emission control signal for the emissive display panel.

13. A method comprising:

controlling a brightness of frames displayed at a display panel via pulse width modulation (PWM) of a brightness control signal provided to the display panel;

providing frames for display at the display panel with a variable refresh rate such that a start of each frame period is aligned with a corresponding PWM cycle of the brightness control signal and such that each frame period spans an integer multiple of PWM cycles of the brightness control signal; and in response to detecting a delay in rendering of a frame based on a target frame rate, implementing a compensatory variable refresh rate (VRR) scheme that maintains an effective PWM duty cycle of the brightness control signal for each display frame period of one or more display frame periods.

14. The method of claim 13, further comprising:

determining a maximum frame rate and a minimum frame rate that are integer divisors of a PWM frequency of the brightness control signal; and selecting as a target frame rate for providing the frames for display a frame rate between the minimum frame rate and maximum frame rate and which is an integer divisor of the PWM frequency.

15. The method of claim 13, wherein:

the display panel is a transmissive display panel and the brightness control signal is a backlight control signal for the transmissive display panel; or the display panel is an emissive display panel and the brightness control signal is an emission control signal for the emissive display panel.

16. A system comprising:

a frame rendering subsystem configured to render a sequence of frames at a variable rate; and a display control subsystem coupled to the frame rendering subsystem and coupleable to a display panel, the display control subsystem configured to:

provide a brightness control signal to the display panel, the brightness control signal configured to control a brightness of frames displayed at a display panel via pulse width modulation (PWM) of the brightness control signal;

provide a first frame for display at the display panel at a target frame rate for a first frame period, the target frame rate being an integer divisor of a PWM frequency of the brightness control signal; and in response to detecting a delay in rendering of a second frame based on the target frame rate:

provide the first frame for display again at a maximum frame rate for a second frame period that commences with termination of the first frame period, is an integer multiple of a PWM period of the brightness control signal, and is aligned with a corresponding PWM cycle of the brightness control signal; and provide the second frame for display at the target frame rate for a third frame period that commences with termination of the second frame period.

17. A system comprising:

a frame rendering subsystem configured to render a sequence of frames at a variable rate; and a display control subsystem coupled to the frame rendering subsystem and coupleable to a display panel, the display control subsystem configured to:

provide a brightness control signal to the display panel, the brightness control signal configured to control a brightness of frames displayed at a display panel via pulse width modulation (PWM) of the brightness control signal;

provide a first frame for display at the display panel at a target frame rate for a first frame period, the target frame rate being an integer divisor of a PWM frequency of the brightness control signal;

determine a scan-in delay that is an integer multiple of a PWM period of the brightness control signal and which represents a delay between scan in of a frame to a frame buffer and scan out of that frame from the frame buffer to the display panel; and in response to detecting a delay in rendering of a second frame based on the target frame rate:

provide the second frame for display for a second frame period that commences with termination of the first frame period, is equal to a sum of the first frame period and the scan-in delay, and is aligned with a corresponding PWM cycle of the brightness control signal; and displaying a third frame at the target frame rate for a third frame period that commences with termination of the second frame period.

* * * * *